US007202308B2

(12) United States Patent
Boussand et al.

(10) Patent No.: US 7,202,308 B2
(45) Date of Patent: Apr. 10, 2007

(54) HYDROGENATION METHOD FOR UNSATURATED BLOCK COPOLYMERS AND HYDROGENATED UNSATURATED BLOCK COPOLYMERS

(75) Inventors: Beatrice Boussand, Saint Foy les Lyons (FR); Philippe Bonnet, Lyons (FR); Francois Court, Fontaine l'Abbe (FR); Michel Devic, Saint Foy les Lyons (FR); Manuel Hidalgo, Bois-Colombes (FR); Christophe Navarro, Bidache (FR)

(73) Assignee: Atofina, Puteaux (FR)

( * ) Notice: Subject to any disclaimer, the term of this patent is extended or adjusted under 35 U.S.C. 154(b) by 351 days.

(21) Appl. No.: 10/466,170

(22) PCT Filed: Nov. 23, 2001

(86) PCT No.: PCT/FR01/03703

§ 371 (c)(1),
(2), (4) Date: Jan. 29, 2004

(87) PCT Pub. No.: WO02/50136

PCT Pub. Date: Jun. 27, 2002

(65) Prior Publication Data

US 2004/0116615 A1    Jun. 17, 2004

(30) Foreign Application Priority Data

Dec. 21, 2000 (FR) .................................. 00 16753

(51) Int. Cl.
*C08F 8/02* (2006.01)

(52) U.S. Cl. ................ 525/338; 525/330.3; 525/332.8; 525/332.9; 525/339

(58) Field of Classification Search ................ 525/338, 525/339
See application file for complete search history.

(56) References Cited

U.S. PATENT DOCUMENTS 5,886,112 A    3/1999   Vuillemin et al.

FOREIGN PATENT DOCUMENTS

| BR | 9802101 | 5/2000 |
|---|---|---|
| DE | 42 40 445 | 6/1994 |
| DE | 196 43 889 | 5/1998 |
| EP | 524 054 | 1/1993 |
| EP | 749 987 | 12/1996 |
| WO | WO 0040673 | 7/2000 |

OTHER PUBLICATIONS

Muller L A et al., "Two-phase catalytic NBR hydrogenation by RuHCl(CO) (Pcy3)2 immobilized in 1-butyl-3-methylimidazolium tetrafluoroborate molden salt", Macromol. Rapid Communl, vol. 19, No. 8, 1998, pp. 409-411.
International Search Report (Form PCT/ISA/210), issued for PCT/FR01/03703.
Muller L A et al., "Two-phase catalytic NBR hydrogenation by RuHCl(CO) (Pcy3)2 immobilized in 1-butyl-3-methylimidazolium tetrafluoroborate molden salt", Macromol. Rapid Communl, vol. 19, No. 8, 1998, pp. 409-411.
Clemens Auschra, et al., "Synthesis of block copolymers with poly(methyl methacrylate): P:(B-b-MMA), P(EB-b-MMA), P(S-b-B-b-MMA)", Polymer Bulletin 30, pp. 257-264 (1993).
Clemens Auschra, et al., "Thermal stability of poly(styrene-b-methyl methacrylate) and poly(styrene-b-ethylene-co-1-butene-b-methyl methacrylate)", Polymer Bulletin 30, pp. 305-311 (1993).
Reimund Stadler, et al., "Morphology and Thermodynamics of Symmetric Poly(A-block-B-block-C) Triblock Copolymers", Macromolecules (1995), 28, pp. 3080-3097.
Vittoria Balsamo, et al., "Ternary ABC block copolymers based on one glassy and two crystallizable blocks: polystyrene-block-polyethylene-block-poly(ε-caprolactone)", Macromol. Phys. 199, pp. 1063-1070 (1998).
Paulo A. Z. Suarez, et al., "Communication—The Use of New Ionic Liquids in Two-Phase Catalytic hydrogenation Reaction by Rhodium Complexes", Polyhedron, 15, No. 7 (1996), pp. 1217-1219.
Clemens Auschra, et al., "New Ordered Morphologies in ABC Triblock Copolymers", Macromolecules 1993, 26, pp. 2171-2174.
Translation of European Patent No. 0 672 085, which is the English-language equivalent of DE 42 40 445 (filed in IDS on Jan. 29, 2004).

*Primary Examiner*—Bernard Lipman
(74) *Attorney, Agent, or Firm*—Smith, Gambrells & Russell, PLLC

(57) ABSTRACT

Use is made, for selectively hydrogenating the olefinic double bonds of block copolymers, at least one block of which comprises olefinic double bonds, using a catalyst based on a metal from Group VIII in a medium comprising an organic solvent for the copolymer and an ionic liquid as solvent for the catalyst, of a water-immiscible ionic liquid, preferably an ionic liquid for which the anion is the hexafluorophosphate anion and the cation is the 1-butyl-3-methylimidazolium (bmim$^+$) or 1-ethyl-3-methylimidazolium (emim$^+$) cation.

Applied to poly(styrene)-b-poly(butadiene)-b-poly(methyl methacrylate) block copolymers, the poly(butadiene) block of which predominantly possesses a 1,4-microstructure, this process results in copolymers for which the degree of hydrogenation is at least equal to 50% and which exhibit a melting point of greater than 30 °C.

25 Claims, No Drawings

HYDROGENATION METHOD FOR UNSATURATED BLOCK COPOLYMERS AND HYDROGENATED UNSATURATED BLOCK COPOLYMERS

FIELD OF THE INVENTION

The present invention relates to the field of block copolymers and has more particularly as subject-matter a process for the hydrogenation of unsaturated block copolymers and novel hydrogenated block copolymers.

BACKGROUND OF THE INVENTION

AB or ABC block copolymers having at least one block comprising olefinic double bonds (polybutadiene, polyisoprene, and the like) can be used alone or as a blend with other polymers, such as PVDF, PVC, PVCC, and the like, for improving some of their properties. However, the presence of the block comprising olefinic double bonds renders them sensitive to light, to some oxidizing agents and to heat. The selective hydrogenation of this block makes it possible to prepare novel materials comprising polyolefins while improving their stability (towards light, towards oxidizing agents and towards heat) and their mechanical properties. This hydrogenation also results in a modification in the physical properties of the polymer by creating a block comprising fewer olefinic double bonds, which block can become a semicrystalline block. Furthermore, the presence of a polyolefin chain renders them compatible with a broader range of polymers (including polyolefins), which represents a very large potential market.

The hydrogenation of these block copolymers can be carried out by non-catalytic methods, generally performed in the presence of hydrazine derivatives, such as, for example, p-toluenesulphonylhydrazine. Although these methods do not require a reactant which operates under pressure, their industrial implementation cannot be envisaged because of the high cost of the p-toluenesulphonylhydrazine reactant.

Block copolymers can also be hydrogenated by heterogeneous catalysis. However, as heterogeneous catalysts have a low activity, it is necessary to operate at a high temperature and a high hydrogen pressure and to use large amounts of catalyst. These operating conditions can result in a decomposition or in a crosslinking of the polymer and in a decrease in the selectivity of the hydrogenation (hydrogenation of functional groups other than the olefinic double bonds: esters, aromatic double bonds, and the like).

The hydrogenation can also be carried out in a homogeneous medium under milder conditions by using, as catalysts, noble metal complexes (Wilkinson's catalyst, and the like) or cobalt or nickel salts with reducing agents (triethylaluminium, butyllithium, and the like). The use of a very small amount of catalyst can result in an economical process, even if the catalyst is not recovered; however, the latter partly remains in the polymer, which can be harmful to its properties and thus require its purification. On the other hand, when it is necessary to use a large amount of catalyst, it has to be recovered for recycling.

The hydrogenation of block copolymers having a polybutadiene block by homogeneous catalysis in the presence of Wilkinson's catalyst has formed the subject of many publications, in particular Patent Application DE 4 240 445, the thesis by C. Auschra at the University of Mainz (1992), entitled "*Synthese von neuartigen Multi block copolymer en und deren Verwendung in Polymerlegierungen*" [Synthesis of novel multiblock copolymers and their use in polymer alloys], the articles by C. Auschra et al. in Polymer Bulletin, 30 (1993), 257–264 and 305–311 and in Macromolecules, 26 (1993), 2171–2174, and an article by R. Stadler et al. in Macromolecules, 28 (1995), 3080–3097. The copolymers used have a polybutadiene block formed of butadiene predominantly possessing a 1,2-microstructure (approximately 90%), which hydrogenates much more easily than polybutadiene predominantly possessing a 1,4-microstructure (85 to 89%). Furthermore, the amount of Wilkinson's catalyst used is high (8 000 molar ppm per mole of double bond).

The hydrogenation of a polystyrene-polybutadiene-poly(ε-caprolactone) triblock copolymer in the presence of Wilkinson's catalyst (10 000 ppm), the polybutadiene block predominantly possessing a 1,4-microstructure, is disclosed in Patent Application DE 19643889 and in Macromol. Chem. Phys., 199 (1998), 1063–1070.

The selective hydrogenation of the polybutadiene block of an NBR (Nitrile Butadiene Rubber) copolymer without affecting the nitrile groups is described by L. A. Müller et al. in Macromol. Rapid Commun., 19 (1998), 409–411. The reaction, catalysed by the RuHCl(CO)(PCy$_3$)$_2$ complex, is carried out in a two-phase medium (ionic liquid+organic solvent); the ionic liquid is 1-butyl-3-methylimidazolium tetrafluoroborate (bmimBF$_4$) and the NBR is dissolved in toluene. The ionic liquid solution comprising the catalyst can be recycled several times.

This process, which makes it possible to easily recover the catalyst and to recycle it, also forms the subject-matter of Patent Application BR 98 02101, Example 2 of which illustrates the same hydrogenation of an NBR with the same ionic liquid (bmimBF$_4$) but the general features of which include a good number of other catalysts, of other unsaturated copolymers and of other ionic liquids, such as those in which the cation is a quaternary ammonium or phosphonium group and the anion derives from a Lewis acid, such as, for example, the AlCl$_4^-$, RSO$_3^-$, BF$_4^-$, ZnCl$_4^{2-}$, ZnBr$_4^{2-}$, PF$_6^-$, CuCl$_2^-$ or FeCl$_3^-$ anions, and the like.

As indicated above, the hydrogenation of copolymers comprising a butadiene block predominantly possessing a 1,4-microstructure is difficult. Thus, when the method of Example 2 of document BR 98 02101 is applied to the hydrogenation of such a copolymer (SBM triblock) with Wilkinson's catalyst at a moderate temperature (60° C.), a degree of hydrogenation of the order of 30% only is obtained.

DESCRIPTION OF INVENTION

It has now been found that this degree is greatly improved by using a water-immiscible ionic liquid, in particular an ionic liquid for which the anion is the hexafluorophosphate anion (PF$_6^-$). Under the same operating conditions, the degree of hydrogenation changes from 30% to of the order of 75% by using 1-butyl-3-methylimidazolium hexafluorophosphate (bmimPF$_6$) as ionic liquid.

This result is surprising as, in an article relating to the hydrogenation of cyclohexene in a two-phase medium with rhodium catalysts dissolved in ionic liquids of the bmim type [Polyhedron, 15, No. 7 (1996), 1217–1219], P. A. Z. Suarez et al. did not observe any substantial difference according to the nature of the anion: AlCl$_4^-$, BF$_4^-$ or PF$_6^-$ (entries 2, 3 and 5 in Table 1).

A subject-matter of the invention is thus a process for the selective hydrogenation of the olefinic double bonds of block copolymers, at least one block of which comprises olefinic double bonds, using a catalyst based on a metal from Group VIII in a medium comprising an organic solvent and an ionic liquid, characterized in that a water-immiscible ionic liquid is used.

The term "ionic liquid" is understood to mean here any non-aqueous salt with an ionic nature which is molten at ambient temperature or at least at moderate temperature (<150° C.). In these ionic liquids, which can be represented by the general formula $Q^+A^-$, $Q^+$ is a quaternary ammonium, aromatic ammonium, quaternary phosphonium or ternary sulphonium cation.

The anion $A^-$ of the ionic liquid according to the invention is preferably the hexafluorophosphate anion. Mention may be made, as another non-limiting example of $A^-$ anions in accordance with the invention, of the $(CF_3SO_2)_2N^-$ anion.

Although it is preferable to use ionic liquids for which the cation is an imidazolium cation of general formula:

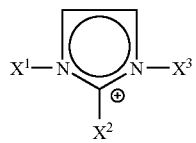

in which $X^1$ and $X^3$, which are identical or different, are $C_1$–$C_4$ alkyl radicals and $X^2$ is a hydrogen atom or a methyl radical, preferably a 1,3-dialkylimidazolium cation and more particularly the 1-butyl-3-methylimidazolium ($bmim^+$) and 1-ethyl-3-methylimidazolium ($emim^+$) cations, it would not be departing from the scope of the present invention to use an ionic liquid for which the $Q^+$ cation corresponds to one of the following general formulae:

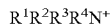
$R^1R^2R^3R^4N^+$

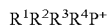
$R^1R^2R^3R^4P^+$

$R^1R^2R^3S^+$ in which the $R^1$ to $R^4$ symbols, which are identical or different, each denote a saturated or unsaturated, cyclic or non-cyclic, or aromatic hydrocarbyl, chlorohydrocarbyl, fluorohydrocarbyl, chlorofluorohydrocarbyl or fluorocarbyl group having from 1 to 10 carbon atoms, it also being possible for one or more of these groups to comprise one or more heteroatoms, such as N, P, S or O.

The ammonium, phosphonium or sulphonium cation $Q^+$ can also form part of a saturated or unsaturated or aromatic heterocycle having from 1 to 3 nitrogen, phosphorus or sulphur atoms, it being possible for this heterocycle to carry $R^1$ to $R^4$ groups as defined above.

In the process according to the invention, the catalyst is dissolved in the ionic liquid and the copolymer to be hydrogenated in an organic solvent.

The catalyst used, based on a metal from Group VIII (in particular rhodium, ruthenium or palladium), is introduced in the form of a complex which is soluble in the ionic liquid. Mention may be made, as non-limiting examples of such complexes, of Wilkinson's catalyst $RhCl(PPh_3)_3$, Osborn's catalyst $[Rh(nbd)(PPh_3)_2]^+PF_6^-$ and the complexes $RuCl_2(PPh_3)_3$ and $PdCl_2(PPh_3)_2$, Ph denoting the phenyl radical and nbd denoting norbornadiene. An excess of ligand (for example triphenylphosphine $PPh_3$, in the case of Wilkinson's catalyst) can be added to the reaction mixture to prevent the complex from dissociating.

The organic solvent used to dissolve the copolymer to be hydrogenated is preferably an aromatic solvent, such as benzene, toluene, xylene and ethylbenzene. For economical reasons, the concentration of the copolymer in the organic solvent is preferably as high as possible. However, this concentration must be less than or equal to the solubility of the hydrogenated copolymer at the reaction temperature. Depending upon the copolymer, this concentration can be between 3 and 60% by mass, preferably between 3 and 30% and more particularly between 3 and 15%.

Use may be made of between 0.01 and 5 molar % of catalyst per mole of olefinic double bonds to be hydrogenated and preferably of between 0.02 and 2 molar %.

The minimum amount of ionic liquid to be used depends on the catalyst chosen and on its solubility in the ionic liquid. Thus, it is necessary to introduce at least the volume of ionic liquid which makes it possible to dissolve all the catalyst.

The ratio of the volume of ionic liquid to the volume of organic solvent must be between 0.01 and 25, preferably between 0.05 and 5 and more particularly between 0.1 and 1.

The hydrogenation according to the invention can be carried out at between 20 and 180° C., preferably between 20 and 150° C. and more particularly between 50 and 125° C. As the ionic liquid makes it possible to stabilize the catalyst, it is possible to operate at higher temperatures than those used in homogeneous hydrogenation without an ionic liquid and thus to accelerate the reaction rate. It is preferable to add a stabilizing agent for the polymer (0.1 to 5% by mass, depending on the stabilizing agent), it being possible for the polymer to decompose if the temperature is too high.

The reaction can be carried out under a pressure of between 1 and 200 bar relative, preferably between 1 and 100 bar and more particularly between 20 and 60 bar.

In order to obtain good dispersion of the hydrogen in the reaction medium, it is advantageous to operate with efficient stirring, for example by using, for this purpose, a Rushton auto-suction turbine.

After the reaction, the hydrogenated copolymer can be isolated by precipitation, by introducing the reaction medium into a large amount of a non-solvent for the hydrogenated copolymer (preferably an alcohol, such as methanol, ethanol or isopropanol), or, when there are two separate phases, by separation by settling of the organic phase and then isolation of the copolymer according to the usual methods (for example, evaporation of the solvent or atomization or devolatilization or flocculation or precipitation from a non-solvent).

When the reaction medium does not separate by settling (first case), the precipitation of the hydrogenated copolymer is carried out by using a non-solvent (preferably an alcohol) in an amount which can range from 1 to 20 times the volume of the organic solvent and decreases in proportion as the degree of hydrogenation of the copolymer increases. Use is advantageously made of an amount of non-solvent ranging from 2 to 10 times the volume of the organic solvent, preferably 5 to 10 times. The reaction medium comprising the hydrogenated copolymer is brought to a temperature of between 20 and 80° C., preferably between 25 and 60° C., and is then run into the non-solvent with stirring. The temperature of the non-solvent before the reaction medium is run into it is advantageously between 0 and 60° C., preferably 0 to 40° C. After the reaction medium has been run into the non-solvent, the stirring can be maintained and the hydrogenated copolymer is then filtered off and then dried under vacuum. When the polymer is not completely hydrogenated, it is preferable not to heat it during the drying, so as to eliminate any risk of damage to the polymer (crosslinking, and the like). The hydrogenated copolymer can be analysed by NMR and its remaining double bonds can be quantitatively determined by measuring the bromine number.

The recycling of the catalyst can be carried out in two ways, depending upon the method of isolation of the hydrogenated copolymer:

1. In the case where the ionic liquid phase was separated by settling, it is recycled directly to the reactor with the catalyst which it comprises.

2. When the reaction mixture does not separate by settling, the hydrogenated copolymer is isolated by precipitation by introduction of the reaction mixture into a non-solvent. The filtrates obtained after isolation of the copolymer are concentrated by evaporation of the non-solvent and of a portion of the organic solvent, this evaporation preferably being carried out at between 60 and 100° C. under reduced pressure. The concentrated solution, which then comprises the ionic liquid and the catalytic complex, which are not volatile, has added to it an amount of organic solvent equal to that lost during the evaporation and a fresh charge of copolymer for carrying out a fresh hydrogenation.

The process according to the invention can be applied to the hydrogenation of any block copolymer with at least one block comprising olefinic double bonds but it is of particular advantage for the hydrogenation of block copolymers of the SBM [poly(styrene)-b-poly(butadiene)-b-poly(methyl methacrylate)] type, the poly(butadiene) block of which predominantly possesses a 1,4-microstructure.

In these SBM copolymers, which are usually prepared by anionic polymerization according to known methods, such as disclosed, for example, in Patents EP 524 054 and EP 749 987, the percentage by mass of the poly(styrene) block can range from 5 to 80 (preferably from 10 to 60), that of the poly(butadiene) block from 5 to 80 (preferably from 10 to 60) and that of the poly(methyl methacrylate) block from 90 to 15 (preferably from 80 to 30). Their number-average molar mass is generally at least equal to 20 000 g/mol and preferably between 50 000 and 200 000 g/mol. These copolymers can comprise synthetic intermediates, in particular poly(styrene) and poly(styrene)-b-poly(butadiene) diblock copolymer.

The application of the process according to the invention to the selective hydrogenation of these SBM copolymers makes it possible to obtain novel partially or completely hydrogenated block copolymers, the degree of hydrogenation being at least equal to 50%, preferably between 70 and 100% and more particularly between 90 and 100%. These novel copolymers are crystalline at ambient temperature; they generally exhibit a melting point of greater than 30° C.

EXAMPLES

In the following examples, which illustrate the invention without limiting it, three SBM triblock copolymers and an SBS triblock copolymer, defined below, were hydrogenated:

SBM-1: poly(styrene)-b-poly(butadiene)-b-poly(methyl methacrylate) triblock copolymer with the composition (% by mass) 34/35/31, the average molar mass of the poly(styrene) block being 27 600 g/mol and 89% of the poly(butadiene) block possessing a 1,4-microstructure.

SBM-2: poly(styrene)-b-poly(butadiene)-b-poly(methyl methacrylate) triblock copolymer with the composition (% by mass) 39/39/22, the average molar mass of the poly(styrene) block being 36 700 g/mol and 89% of the poly(butadiene) block possessing a 1,4-microstructure.

SBM-3: poly(styrene)-b-poly(butadiene)-b-poly(methyl methacrylate) triblock copolymer with the composition (% by mass) 21/21/58, the average molar mass of the poly(styrene) block being 15 900 g/mol and 88% of the poly(butadiene) block possessing a 1,4-microstructure.

SBS: poly(styrene)-b-poly(butadiene)-b-poly(styrene) triblock copolymer comprising 19 molar % of polystyrene and 81 molar % of polybutadiene and 86% of the poly(butadiene) block possessing a 1,4-microstructure.

Example 1

A solution of 1.759 g of SBM-1 triblock copolymer in 33.25 g of ethylbenzene and a solution of 15 mg of Wilkinson's catalyst $RhCl[P(C_6H_5)_3]_3$ and of 151.3 mg of triphenylphosphine (TPP) in 15.2 g of 1-butyl-3-methylimidazolium hexafluorophosphate (ionic liquid $bmimPF_6$) are prepared in a glove box under a nitrogen atmosphere.

These two solutions are subsequently mixed with air excluded and then the two-phase mixture is introduced into a stainless steel autoclave provided with a PTFE internal lining and stirred by a Rushton turbine (stainless steel auto-suction turbine).

After confirming the leaktightness with nitrogen at 50 bar, the reactor is pressurized with 50 bar of hydrogen and the temperature is brought to 60° C. for 24 hours with stirring (1 000 rev/min).

After cooling the reactor, 45 mg of Irganox® B900 (stabilizing agent) are added and the reaction mixture obtained (stable emulsion of low fluidity) is then heated to 40° C. and then run into 350 ml of methanol at 40° C. with stirring. A white precipitate (hydrogenated SBM) and a single clear liquid phase are obtained.

After filtering on a Büchner funnel and drying in a vacuum oven for 12 hours at 25° C., 1.75 g of hydrogenated SBM and 377 g of clear filtrates are obtained. Quantitative determination of the remaining double bonds, carried out by measuring the bromine number and by NMR, indicates that the degree of hydrogenation of the polybutadiene block is 76%.

Analysis of the hydrogenated SBM shows a rhodium content of 10 ppm, i.e. a loss of 0.16 mg of Wilkinson's catalyst, which corresponds to 1% of the catalyst charged.

DSC analysis of the hydrogenated product shows a melting point of 54° C. (accuracy: ±2° C.), whereas the starting material (SBM-1) is not crystalline.

Example 2

The filtrates from Example 1 (377 g) are concentrated on a rotary evaporator at 90° C. under reduced pressure to remove the methanol.

1.750 g of SBM-1 triblock copolymer are dissolved in the concentrated solution, positioned with air excluded, and then ethylbenzene is added to bring the volume of the solution to 50 ml.

This solution is then charged to the autoclave and the hydrogenation is carried out under the same conditions as in Example 1.

1.70 g of hydrogenated SBM are thus obtained with a degree of hydrogenation of 66% and a rhodium content of 18 ppm.

Example 3 (Comparative)

The hydrogenation is carried out in the same equipment and according to the same procedure as in Example 1 but without using an ionic liquid.

15 mg of Wilkinson's catalyst and 150 mg of TPP are dissolved in a solution composed of 1.759 g of SBM-1 and of 48.5 g of ethylbenzene. The hydrogenation is carried out for 24 hours at 60° C. under a pressure of 50 bar of hydrogen.

After precipitating from methanol, 1.58 g of SBM are obtained, which SBM is 75% hydrogenated and has a rhodium content of 290 ppm. This corresponds to a loss of 4.13 mg of Wilkinson's catalyst, i.e. a loss 29 times greater than that in Example 1 according to the invention.

Example 4

The hydrogenation is carried out as in Example 1, except that the stabilizing agent (45 mg of Irganox® B900) is added before the reaction to the SBM solution (1.754 g of SBM-1 and 33.45 g of ethylbenzene) and except that the hydrogenation reaction is carried out at 120° C. for 24 hours under 50 bar of hydrogen.

At the end of the reaction, an emulsion is obtained which forms a gel, to which 100 ml of ethylbenzene are added, and heating is carried out at 40° C. to liquefy the gel. The emulsion is subsequently run into 350 ml of methanol at 40° C. with stirring and then the white precipitate obtained is filtered off and dried as in Example 1.

1.75 g of SBM are obtained, which SBM is 97% hydrogenated and comprises 26 ppm of rhodium, corresponding to 0.42 mg of Wilkinson's catalyst.

Example 5

The filtrates from Example 4 are concentrated on a rotary evaporator at 90° C. under reduced pressure to remove the methanol.

1.754 g of SBM-1 copolymer are dissolved in the concentrated solution, positioned with air excluded, and then ethylbenzene is added to bring the volume of the solution to 50 ml.

This solution is then charged to the autoclave and the hydrogenation is carried out as in Example 4.

1.68 g of hydrogenated SBM are thus obtained with a degree of hydrogenation of 95%.

Example 6

The hydrogenation is carried out exactly as in Example 4 but replacing the Wilkinson's catalyst, which comprises rhodium, with 15.2 mg of ruthenium catalyst $RuCl_2[P(C_6H_5)_3]_3$.

1.75 g of hydrogenated SBM are obtained with a degree of hydrogenation of 89% and a ruthenium content of 1 ppm.

Example 7 (Comparative)

The hydrogenation is carried out in the same equipment and according to the same procedure as in Example 6 but without using an ionic liquid.

15.3 mg of $RuCl_2[P(C_6H_5)_3]_3$ catalyst and 150 mg of TPP are dissolved in a solution composed of 1.755 g of SBM-1 and of 48.5 g of ethylbenzene. The hydrogenation is carried out for 24 hours at 120° C. under a pressure of 50 bar of hydrogen.

After precipitating from methanol, 1.53 g of SBM are obtained, which SBM is 87% hydrogenated and has a ruthenium content of 60 ppm. This corresponds to a loss of 0.87 mg of catalyst, i.e. a loss 60 times greater than that in Example 6 according to the invention.

Example 8 (Comparative)

The hydrogenation is carried out in the same equipment and according to the same procedure as in Example 1 but using 1-butyl-3-methylimidazolium tetrafluoroborate ($bmimBF_4$) as ionic liquid.

15 mg of Wilkinson's catalyst and 150 mg of TPP are dissolved in 15.1 g of $bmimBF_4$ and a solution composed of 1.757 g of SBM-1 and 33.23 g of ethylbenzene is added.

The hydrogenation is carried out for 24 hours at 60° C. under a pressure of 50 bar of hydrogen.

After precipitating from methanol, 1.75 g of SBM are obtained, which SBM is 30% hydrogenated (i.e. a degree of hydrogenation 60% lower than that obtained with $bmimPF_6$) and has a rhodium content of 15 ppm.

Example 9

If the ethylbenzene in Example 1 is replaced with the same volume of tetrahydrofuran, a similar result is obtained.

Example 10

The hydrogenation is carried out exactly as in Example 1 but using the SBM-2 triblock copolymer.

The hydrogenated copolymer with a degree of hydrogenation of 63% is obtained. Its DSC analysis shows a melting point at 36° C. (accuracy: ±2° C.), whereas the starting material (SBM-2) is not crystalline.

Example 11

The hydrogenation is carried out exactly as in Example 1 but using the SMB-3 triblock copolymer.

A hydrogenated copolymer with a degree of hydrogenation of 70% is obtained. Its DSC analysis shows a melting point at 45° C. (accuracy: ±2° C.), whereas the starting material (SBM-3) is not crystalline.

Example 12

The hydrogenation is carried out exactly as in Example 1 but replacing the SBM-1 triblock copolymer with the SBS copolymer.

A hydrogenated copolymer with a degree of hydrogenation of 85% is obtained. Its DSC analysis shows a melting point at 73° C. (accuracy: ±2° C.), whereas the starting SBS is not crystalline.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The foregoing references are hereby incorporated by reference.

The invention claimed is:

1. Process comprising the selective hydrogenation of the olefinic double bonds of a block copolymer, at least one block of which comprises one or more olefinic double bonds, using a catalyst based on a metal from Group VIII in a medium comprising an organic solvent for the copolymer and an ionic liquid as solvent for the catalyst, a water-immiscible ionic liquid is used.

2. Process according to claim 1, wherein the anion of the ionic liquid is the hexafluorophosphate anion.

3. Process according to claim 1, wherein the cation of the ionic liquid is a quaternary ammonium, aromatic ammonium, quaternary phosphonium or ternary sulphonium cation.

4. Process according to claim 3, wherein the cation of the ionic liquid is an imidazolium cation of formula:

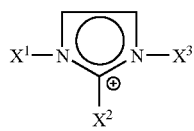

in which $X^1$ and $X_3$, which are identical or different, are $C_1$–$C_4$ alkyl radicals and $X^2$ is a hydrogen atom or a methyl radical.

5. Process according to claim 4, wherein the cation of the ionic liquid is the 1-butyl-3-methyl-imidazolium ($bmim^+$) or 1-ethyl-3-methylimidazolium ($enim^+$) cation.

6. Process according to claim 1, wherein the organic solvent for the copolymer is an aromatic solvent.

7. Process according to claim 1, wherein the catalyst is based on rhodium, on ruthenium or on palladium.

8. Process according to claim 1, wherein the ratio of the volume of ionic liquid to the volume of organic solvent is between 0.05 and 5.

9. Process according to claim 1, wherein use is made of 0.01 to 5 mol of catalyst per 100 mol of olefinic double bonds to be hydrogenated.

10. Process according to claim 1, wherein the hydrogenation is carried out at a temperature of between 20 and 150° C.

11. Process according to claim 1, wherein the hydrogenation is carried out at a hydrogen pressure of between 1 and 100 bar.

12. Process according to claim 1, wherein when the reaction mixture does not separate by settling, the hydrogenated copolymer is precipitated by introducing the reaction mixture, brought to a temperature of between 20 and 80° C., into a non-solvent for the hydrogenated copolymer, this non-solvent being employed in an amount ranging from 1 to 20 times the volume of the organic solvent.

13. Process according to claim 12, wherein the non-solvent is employed in an amount ranging from 2 to 10 times the volume of the organic solvent.

14. Process according to claim 12, wherein the non-solvent is an alcohol.

15. Process according to claim 12, wherein the temperature of the non-solvent, before the introduction of the reaction mixture, is between 0 and 60° C.

16. Process according to claim 1, hydrogenating a poly(styrene)-b-poly(butadiene)-b-poly(methyl methacrylate) block copolymer, the poly(butadiene) block of which predominantly possesses a 1,4-microstructure.

17. Process according to claim 4, wherein the cation is a 1,3-dialkylimidazolium cation.

18. Process according to claim 7, wherein the catalyst is selected from the group consisting of $RhCl(PPh_3)_3$, $Rh(nbd)(PPh_3)_2^+PF_6^-$, $RuCl_2(PPh_3)_3$ and $PdCl_2(PPh_3)_2$.

19. Process according to claim 8, wherein the ratio is between 0.1 and 1.

20. Process according to claim 9, wherein use is made of 0.02 to 2 mol. of the catalyst per 100 mol. of olefinic double bonds to be hydrogenated.

21. Process according to claim 10, wherein hydrogenation is carried out at a temperature of between 50 and 125° C.

22. Process according to claim 11, wherein hydrogenation is carried out at a hydrogen pressure of between 20 and 60 bar.

23. Process according to claim 12, wherein the reaction mixture, prior to the introduction thereof into the non-solvent, is brought to a temperature of between 20 and 60° C.

24. Process according to claim 13, wherein the amount of the non-solvent is from 5 to 10 times the volume of organic solvent.

25. Process according to claim 15, wherein the temperature of the non-solvent, before the introduction of the reaction mixture, is between 0 and 40° C.

* * * * *